United States Patent [19]  [11] 4,333,914
Neely, Jr. et al.  [45] Jun. 8, 1982

[54] METHOD FOR MAKING ALUMINUM TRIMETAPHOSPHATES FROM POWDER REACTANTS

[75] Inventors: James E. Neely, Jr., Butler; Chia-Cheng Lin, Gibsonia; Charlene A. Falleroni, Lower Burrell; Annette Moff, Latrobe, all of Pa.

[73] Assignee: PPG Industries, Inc., Pittsburgh, Pa.

[21] Appl. No.: 210,509

[22] Filed: Nov. 26, 1980

[51] Int. Cl.$^3$ ............................................. C01B 25/36
[52] U.S. Cl. .................................................... 423/314
[58] Field of Search ........................................ 423/314

[56] References Cited

U.S. PATENT DOCUMENTS 2,266,486 12/1941 Booth ..................................... 423/314
4,059,669 11/1977 Thomas ................................. 423/314
4,216,190 8/1980 Neely, Jr. .............................. 423/314

OTHER PUBLICATIONS d'Yvoire, *Study of Trivalent Aluminum and Iron Phosphates v. Long Chain Phosphates and the Metaphosphates,* Bulletin of the Societe, Chemique de France, No. 6, pp. 1237–1243, Jun., '62.

Tsuhako et al., *Studies of the Preparation and Physical Properties of Multivalent Metal Condensed Phosphates,* Bulletin of the Chemical Society of Japan, vol. 46, pp. 2343–2346, Aug., '73.

*Primary Examiner*—O. R. Vertiz
*Assistant Examiner*—Wayne A. Langel
*Attorney, Agent, or Firm*—Donna L. Seidel

[57] ABSTRACT

A method for preparing aluminum trimetaphosphate comprising various chain form polyphosphate species by heating a mixture of aluminum hydroxide and ammonium phosphate is disclosed.

6 Claims, No Drawings

METHOD FOR MAKING ALUMINUM TRIMETAPHOSPHATES FROM POWDER REACTANTS

BACKGROUND OF THE INVENTION

1. Field of the Invention

The present invention relates generally to the art of making Al(PO$_3$)$_3$ and more particularly to the preparation of the different chain forms of aluminum trimetaphosphate.

2. The Prior Art

Crystalline condensed aluminum phosphates are described in the literature by D'Yvoire, who identified a cycle aluminum tetrametaphosphate, the stable A-form of Al(PO$_3$)$_3$, and four long-chain polyphosphates, the B C, D and E forms of Al(PO$_3$)$_3$. According to D'Yvoire, these crystalline condensed aluminum metaphosphates are produced by reacting P$_2$O$_5$ and Al$_2$O$_3$ in a molar ratio of 4 to 15 over several hours.

U.S. Pat. No. 4,216,190 to Neely teaches a method for preparing predominantly the B-form of aluminum trimetaphosphate by the addition of ammonia to a solution of aluminum dihydrogen phosphate, Al(H$_2$PO$_4$)$_3$. A white precipitate is formed, which is directly converted to B-form aluminum trimetaphosphate, Al(PO$_3$)$_3$, by a single elevated temperature treatment.

In a study of the effects of grinding on the structure and properties of various aluminum phosphates, Tsuhako et al report mixing α-alumina and ammonium dihydrogen phosphate, and heating at 500° to 550° C. for 20 hours to obtain the B-form of Al$_4$(P$_4$O$_{12}$)$_3$.

THE PRESENT INVENTION

The present invention provides a simple method for preparing the various long chain forms of aluminum trimetaphosphate. An aluminum compound capable of reacting with a phosphate compound to form aluminum trimetaphosphate is mixed with a phosphate compound capable of reacting with the aluminum compound to form aluminum trimetaphosphate. Both the aluminum compound and the phosphate compound are preferably in powder form. The mixture is subjected to a single heat treatment but for longer times and at lower temperatures than those described in U.S. Pat. No. 4,216,190 to Neely, which discloses very high yields of the B-form of aluminum trimetaphosphate.

DESCRIPTION OF THE PREFERRED EMBODIMENT

An aluminum compound capable of reacting with a phosphate compound to form aluminum trimetaphosphate upon heating is mixed with a suitable phosphate compound. A preferred aluminum compound is aluminum hydroxide. The phosphate compound is preferably ammonium phosphate, which may be monobasic or dibasic. Both aluminum hydroxide and ammonium phosphate are readily available in the preferred powder form.

The aluminum hyroxide and ammonium phosphate are mixed together thoroughly, preferably in approximately stoichiometric quantities. Although the dry powders are preferred, the materials may also be combined in an aqueous slurry or even in solution. However, a major disadvantage of the present invention is the use of dry powder reactants. The blended reactants are then subjected to a single elevated temperature treatment. The treatment temperature is significantly lower and the treatment time substantially longer than the conditions which produce very high yields of the B-form of aluminum trimetaphosphate as disclosed in U.S. Pat. No. 4,216,190 which is incorporated herein by reference. At a given treatment temperature, according to the present invention, the treatment time increases with larger batch size. The resultant product may be analyzed by X-ray diffraction to determine the yield of the various chain forms of aluminum trimetaphosphate.

The present invention will be further understood from the descriptions of specific examples which follow.

EXAMPLE I

A dry powder composition is prepared by combining 658 grams of aluminum hydroxide and 3342 grams of dibasic ammonium phosphate. The powder mixture is blended thoroughly and then heated at a temperature of 470° C. for about 24 hours. The resultant product contains 92 percent of the B-form of aluminum trimetaphosphate, 6 percent D-form and 2 percent of the E-form as determined by X-ray diffraction patterns.

EXAMPLE II

A slurry composition is prepared by thoroughly mixing together 100 grams of aluminum hydroxide, 500 grams of dibasic ammonium phosphate and 144 milliliters of water. The slurry is heated at a temperature of 400° C. for about 17 hours. The resultant product comprises about 65 percent of the B-form of aluminum trimetaphosphate, 30 percent E-form and 5 percent unidentified crystalline species.

EXAMPLE III

Another batch of dry powders is prepared containing 658 grams of aluminum hydroxide and 3342 grams of dibasic ammonium phosphate. The powders are thoroughly mixed by hand before heating. The mixture is heated at a temperature of 563° C. for about one hour and 30 minutes. X-ray diffraction analysis indicates that the product contains 55 percent of the B-form of aluminum trimetaphosphate, 35 percent of the D-form and 10 percent unidentified crystalline species.

The above examples are offered to illustrate the present invention. Various modifications, such as other heat treatment times and temperatures, varying with batch size, as well as other aluminum and phosphate compounds, are included within the scope of the present invention which is defined by the following claims.

We claim:

1. A method for making aluminum trimetaphosphate comprising a mixture of chain form polyphosphate species comprising the steps of:
   a. mixing thoroughly in approximately stoichiometric quantities
      (1) an aluminum hydroxide compound and
      (2) a phosphate compound capable of reacting with the aluminum hydroxide compound to form aluminum trimetaphosphate; and
   b. heating the mixture at a sufficient temperature for a sufficient time to convert the reactants to a product which comprises a mixture of chain form polyphosphate species of aluminum trimetaphosphate.

2. The method according to claim 1, wherein the aluminum compound and phosphate compound mixture is in dry power form.

3. The method according to claim 2, wherein the powder mixture further comprises water to form an aqueous slurry.

4. The method according to claim 1, wherein the mixture is heated at temperatures below about 600° C.

5. The method according to claim 4 wherein the mixture is heated at a temperature between 400° and 600° C.

6. The method according to claim 1, wherein the phosphate compound is ammonium phosphate.

* * * * *

UNITED STATES PATENT AND TRADEMARK OFFICE
CERTIFICATE OF CORRECTION

PATENT NO. : 4,333,914

DATED : June 8, 1982

INVENTOR(S) : James E. Neely, Jr., Chia-Cheng Lin, Charlene A. Falleroni and Annette Moff It is certified that error appears in the above-identified patent and that said Letters Patent are hereby corrected as shown below:

Column 1, line 65, "disadvantage" should be --advantage--.

Signed and Sealed this

Twenty-fourth Day of August 1982

|SEAL|

Attest:

GERALD J. MOSSINGHOFF

Attesting Officer — Commissioner of Patents and Trademarks